Patented Aug. 25, 1936

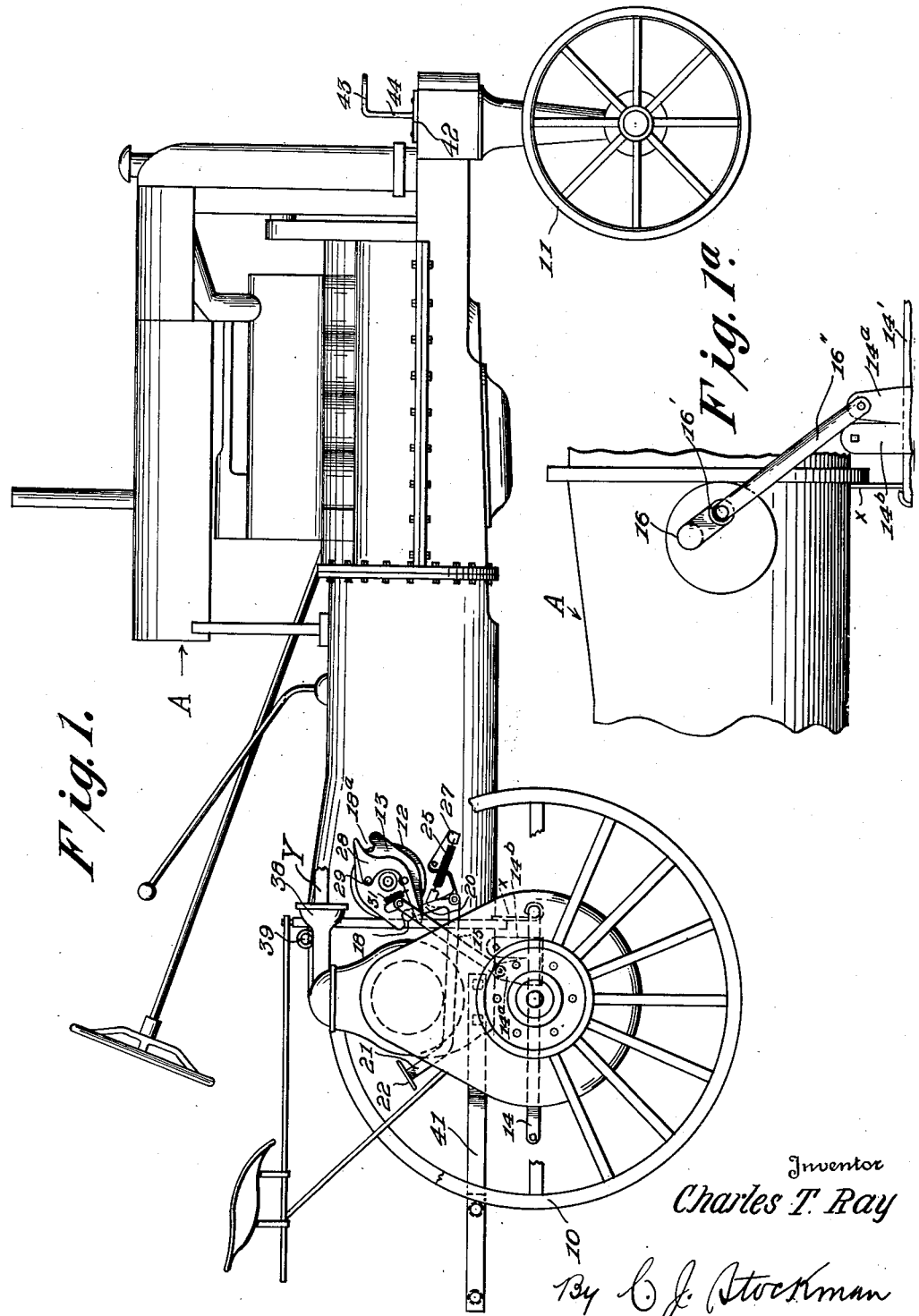

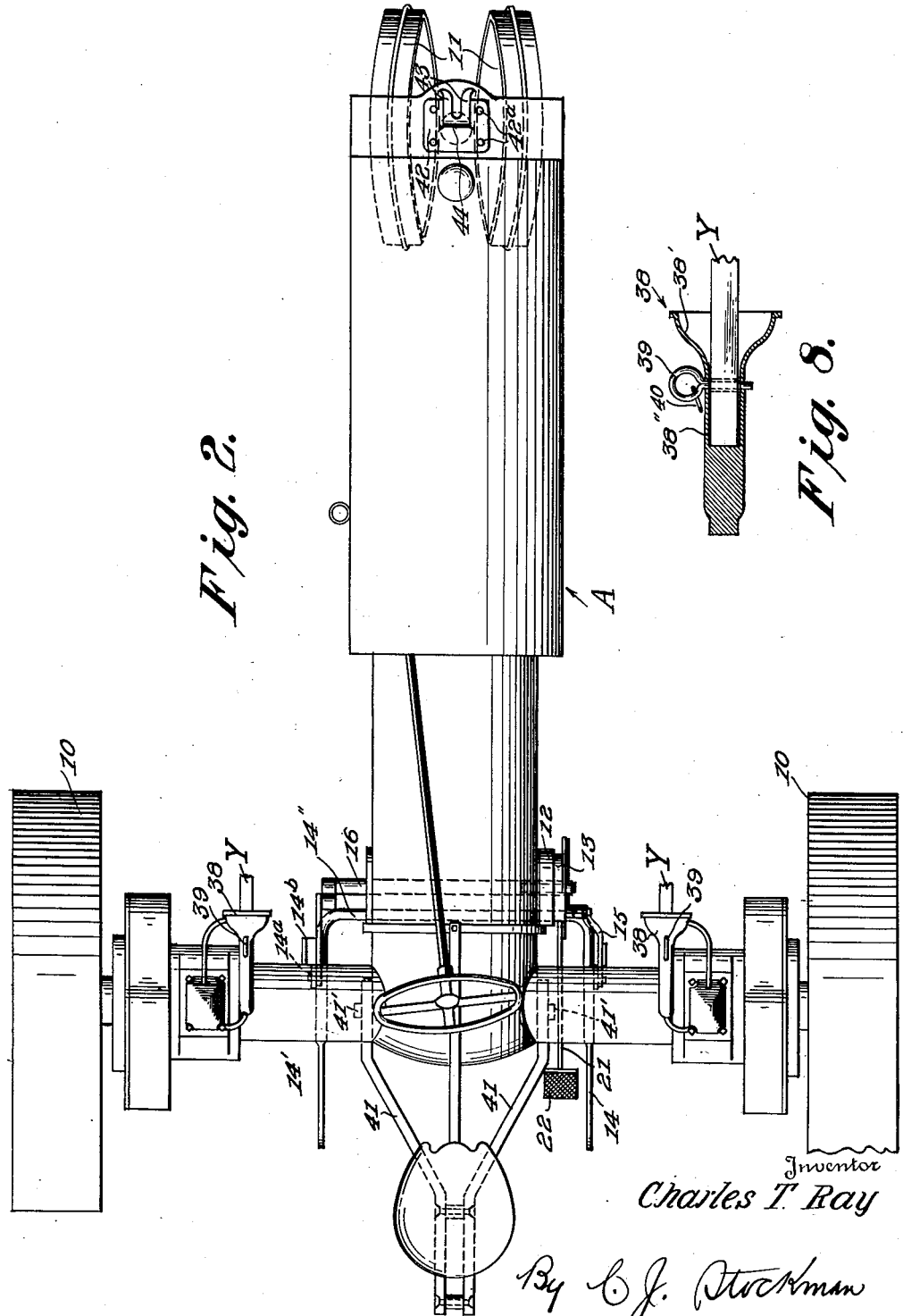

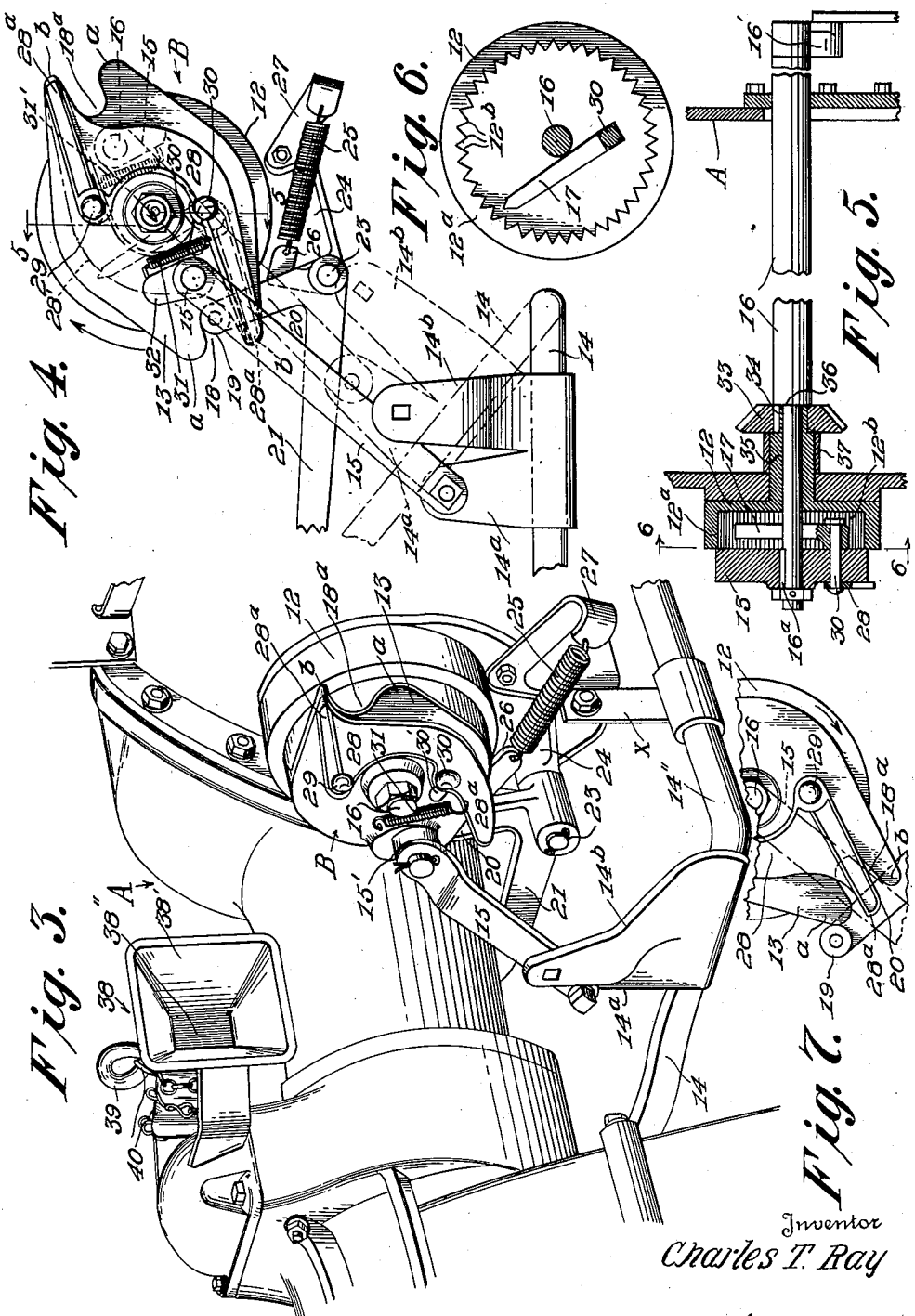

2,051,896

UNITED STATES PATENT OFFICE 2,051,896

FARM TRACTOR

Charles T. Ray, Louisville, Ky., assignor to B. F. Avery & Sons Company, Louisville, Ky., a corporation of Delaware Application July 15, 1932, Serial No. 622,759

14 Claims. (Cl. 97—50)

This invention relates to a farm tractor having as a part thereof a clutch, a bail and certain adjunctive elements which form a power lift mechanism adapting the tractor for the convenient connection therewith of tillage implements (such as plows, planters, cultivators, stalk cutters, etc.) arranged underneath or at opposite sides of the body of the tractor, as well as for farm implements, wagons, etc., generally, which, when operatively connected to the tractor, occupy a trailing relationship with respect to the latter.

The implements to be operatively connected to the power lift mechanism form no part of the present invention and accordingly have not been illustrated herein. Said implements may be of different kinds for tillage or other ground or crop treating purposes, examples of which are illustrated in my Letters Patent of the United States, No. 1,885,763, issued November 1, 1932, upon my application filed Dec. 29, 1930, and numbered, serially, 505,416 and in certain applications filed in the U. S. Patent Office July 15, 1932, and numbered, respectively, 622,757, 622,758 and 622,760. The said patent and applications illustrate and describe the tractor forming the subject of the instant invention but claim the same only in its combinative relationship with the tillage implements themselves, the instant application claiming the tractor and the means which form a part of the tractor and adapt it for the interchangeable connection thereto of said implements.

In the accompanying drawings, wherein like characters of reference denote corresponding parts in the several views:

Fig. 1 is a side elevation of a tractor provided with a clutch and with means which cooperate with the clutch in adapting the tractor for detachable connection therewith of various tillage implements and for raising and lowering said implements from and into ground-working position;

Fig. 1ª is a detail view of a part of one side of the tractor showing the means at said side by which the corresponding end of a raising and lowering bail is connected to the clutch at the opposite side of the implement and to which the other side of said bail is connected;

Fig. 2 is a plan view of the tractor;

Fig. 3 is a perspective view of a part of the tractor, showing the clutch and bail and also showing one of the members formed on the tractor to receive a thrust member which forms part of a tillage implement and through which forward motion is transmitted to said tillage implement;

Fig. 4 is a detail representation showing the clutch in side elevation and the connection of the bail thereto, and shows different positions of the clutch and bail in full and dotted lines, respectively;

Fig. 5 is a sectional representation on the line 5—5 of Fig. 4, and shows one means by which the bail arm at the side of the tractor opposite the clutch may be operatively connected to the driven member of said clutch;

Fig. 6 is a detail sectional view on the line 6—6 of Fig. 5;

Fig. 7 is a detail representation particularly intended to show the relative position of the locking element (19) and the driven member of the clutch near the end of the lowering movement of the clutch and also showing one of the arms (28ª) of the lever (28) in the position it occupies relatively to the corresponding opening 18 during such movement;

Fig. 8 is a detail representation of one of the sockets with the rear end of a thrust member of an implement mounted therein, said member being broken off.

The tractor here shown, designated generally by the letter A, is of the type adapted for row crop operations and except as to the parts which have been added thereto to adapt it for the purposes hereinbefore suggested may be of any suitable construction and hence calls for no particular description further than to state that the carrying wheels 10, 10 at its rear end are sufficiently wide apart to permit tillage implements arranged for two-row row crop operations to be arranged beneath the body of the tractor and the carrying wheels 11, 11 at its forward end are arranged adjacent to each other and close to the longitudinal center of the tractor and preferably are toed in one toward the other to permit said wheels to run between the rows being tilled.

The tractor is provided at one side with a clutch, B, whose driving member is marked 12 and whose driven member is marked 13. In practice, said driving member is continuously rotated from any appropriate moving part of the tractor and the driven member is intermittently rotated from the driving member, means, under control of the operator of the tractor, being provided to connect the driven member to the driving member when the implements connected to the tractor are to be raised from their working position to transport position or are to be lowered from transport position to working position. The clutch is so constructed that one partial revolution of its driven member either raises or lowers the implements having connection with said driven member, according to the position of said member and the corresponding position of the implements at the beginning of said partial revolution—the next partial revolution of said driven member lowering the implements if the preceding partial revolution raised the same and raising said implements if the preceding partial revolution lowered the same. Each of the partial revolutions hereinbefore referred to is preferably one-half of a complete revolution.

The tractor is also provided with two arms 14, 14' arranged at opposite sides thereof and whose forward ends have pivotal connection with the body of the tractor. These arms are swung in clockwise and counterclockwise directions in the successive partial revolutions of the driven member of the clutch, to which driven member they may be connected by any suitable means, the preferred means being shown and presently described. They are suitably connected with each other so as to operate simultaneously, as by a member 14''. It will be observed that in the illustrated embodiment the arms 14, 14' and 14'' conjointly form a lifting bail whose member 14'' is journalled in brackets X suitably secured to any suitable part of the tractor frame. In the illustrated, preferred, embodiment of the invention, each arm is provided at an appropriate place or places in its length with a plurality of lugs or ears 14ᵃ, 14ᵇ which are fixedly secured thereto in any suitable way. The ears 14ᵃ form elements of connecting means between the driven member 13 of the clutch and the respective arms and through which connecting means said arms are swung in clockwise and counterclockwise directions, about the member 14'' as the axis of such movement, by the respective partial revolutions of said driven member. The illustrated connection between the clutch-member 13 and the arm 14 is a direct one consisting of the lug or ear 14ᵃ projecting from said arm and a link 15 whose opposite ends are pivoted to said lug or ear and to said driven member, respectively. The pivotal connection of said link to the clutch-member 13 is shown at 15' and it will be evident that when said clutch-member moves in a clockwise direction, throughout one-half of a complete revolution, from the position shown in full lines in Fig. 4, the arms 14, 14' of the bail will be swung to the position indicated in dot-and-dash outline in said figure. It will also be evident that in the next one-half revolution of the driven member of the clutch, the bail arms will be moved in counterclockwise direction from the position shown in dot-and-dash outline in Fig. 4 to the position shown in full lines in said figure. It may be here mentioned that the implements which are to be raised and lowered as the result of the described movements of the clutch and bail have connection with the arms of the bail, the connections being either to the lugs or ears 14ᵇ or to the outer ends of the bail arms. In my aforesaid co-pending application Ser. No. 622,757 I have illustrated and described a construction in which the connections to the implements include links whose rear ends are respectively pivoted to the lugs or ears 14ᵇ, as indicated at 100 in dotted outline in the instant application; and in my aforesaid Patent No. 1,885,763 I have illustrated a construction in which tillage implements are connected by chains to the rear ends of the bail arms, as indicated in dotted outline at 101 in the instant application. In order that said bail may most effectively perform its function in the raising and lowering of said implements, without at the same time necessitating the provision of a separate clutch mechanism for the respective arms of the bail, the arm 14' also has connection with said driven clutch-member 13. Any suitable means by which the driven clutch-member is connected to the bail arm 14' may be resorted to, one means suitable for the purpose being illustrated in Figs. 5 and 1ᵃ. This means comprises a shaft 16, one of whose ends is keyed to the driven member 13, as shown at 16ᵃ, and the other of whose ends is provided with a crank arm 16' whose upper end is fixedly secured to the shaft and whose lower end is connected by a link 16'' (Fig. 1ᵃ) to the lug or ear 14ᵃ projecting from the bail arm 14'. The shaft 16 extends transversely of the tractor and protrudes from the latter at both ends, one of its said protruding ends being keyed as stated to the driven clutch-member 13 and the other being provided with the crank arm 16'.

The driving member 12 of the clutch is provided with a circumferential rim 12ᵃ whose inner surface is formed with a series of teeth 12ᵇ to be engaged by a pawl 17 when it is desired to rotate the driven member 13 of the clutch to thereby raise or lower the implements connected to the tractor. This pawl is moved into its engaging relationship with the teeth 12ᵇ by means under control of the operator of the tractor and is moved automatically out of its engaging relationship with said teeth at the end of each one-half of a complete revolution of the clutch, at which time the raising or lowering of the implements will have been completed. Means co-acting with relation to said pawl and the driven member of the clutch to effect the release of said driven member from the driving member when the implements have been raised or lowered, as the case may be, and to hold the driven member against movement in the interims between the raising and the lowering operations will now be described.

The driven member 13 is provided with peripheral recesses 18, 18ᵃ arranged at opposite sides of its axis in positions which define the successive partial revolutions of said member. A holding element 19 is arranged to be seated in either of said recesses and is carried by a means which is operative to withdraw it from the recess in which it is seated when operation of the driven member is to be initiated. Said means is preferably pedal-operated and as here shown comprises an arm 20 which projects from one end of a lever 21 whose opposite end is provided with a foot-piece 22 conveniently located to be engaged by the foot of the operator of the tractor. The lever 21 and arm 20 together form a bell crank and said bell crank is provided at the junction of said lever and arm with a pivot pin 23 which is fixed thereto and is journalled in a bracket 24 projecting from any suitable part of the tractor frame. A spring 25 is provided to maintain the holding element 19 in engagement with the driven member of the clutch and to hold the lever 21 yieldingly with its foot-piece in raised position. As here shown, this spring 25 is connected at one end to the bell crank through the medium of an angular member 26 which is fixed to and projects from the pivot pin 23. The opposite end of said spring is connected to a projection 27 which extends from and is suitably secured to the bracket 24.

The pawl 17 is carried by a lever 28 which is curved to extend around the axis of the driven clutch-member 13 and is pivoted to said member at 29. The connection between the pawl 17 and the lever 28 is provided by a stub shaft or pivot 30 which is carried by the lever 28 and extends through a slot 30' in the clutch-member 13. The opposite ends of the lever 28 project to form arms 28ª. These arms are arranged adjacent the respective recesses 18 and 18ª in the rim of the driven clutch-member 13. A spring 31 is connected to the lever 28 and tends to turn said lever about its fulcrum at 29 in a direction in which the ends of the arms 28ª will lie over the respective recesses 18, 18ª and the pawl 17 will be moved into an engaging relationship with the teeth 12ᵇ of the driving clutch-member. This tendency is normally resisted by the holding element 19 which engages the particular arm or projection 28 adjacent the recess 18 or 18ª in which said holding element is seated. Said holding element 19 is preferably of rotative nature for friction-reducing purposes. The spring 31 has one of its ends attached to a bracket 32 which moves with the driven clutch-member 13 and its other end attached to the lever 28 which also moves with said driven member.

When the parts of the clutch mechanism are in the position shown in full lines in Fig. 4, movement therefrom in the direction of the arrow will be a raising movement with respect to the implements having connection with the clutch. It will be evident that when the outer end of the lever 21 is pressed downward the arm 20 will be swung correspondingly and will withdraw the roller 19 from the recess 18 in which it is shown as being seated. This movement of the roller disengages it from the arm or projection 28ª at this side of the lever 28, whereupon the spring 31 becomes operative to swing the lever 28 about its fulcrum at 29 sufficiently to move the pawl 17 into an engaging relationship with the teeth 12ᵇ and also to move both of said arms or projections 28ª of said lever 28 into position in which they overlie the respective recesses 18, 18ª (see Fig. 7). This movement is a slight one and will have been accomplished by the time the roller 19 has been fully withdrawn from the recess 18. The driven member 13 of the clutch, having been thus clutched to the driving member 12 and freed from the roller 19, is now moved rotatively, (together with the lever 28) by said driving clutch-member. When said member 13 and lever 28 have been thus moved the distance predetermined for the raising operation (that is, one-half of a complete revolution in the illustrated embodiment) the recess 18ª and the corresponding arm projection 28ª will be in the position in which the recess 18 and corresponding arm or projection 28ª are shown in Fig. 4. In this movement of the driven clutch-member 13 its outer edge will travel in engagement with the roller 19, said roller being held thereagainst by the spring 25 (see Fig. 7).

It will be noticed that the rim of the driven clutch-member 13 has cam-shaped projections *a* and *b* at opposite sides of each of its recesses 18ª, 18ᵇ and that the cam-shaped projections *a* are at the sides of the respective projections which are in the direction of motion of said driven clutch-member and extend a lesser distance from said member than do the cam-shaped projections *b* at the opposite sides of the respective recesses. The arms or projections 28ª of the lever 28 are of such length that when they have been moved into the positions in which they overlie the respective recesses 18, 18ª they will protrude beyond the outer surfaces of the cam-shaped projections *a*, respectively. They are in this position during the rotative movements of the clutch-member 13. Accordingly, it will be seen that at about the end of the rotary movement predetermined for the said clutch-member 13 the roller 19 will engage the protruding end of the arm or projection 28ª at the corresponding side of the driven clutch-member and will act thereon to move the arm or lever 28 about its fulcrum at 29 and against the tension of the spring 31, and hence cause the pawl 17 to be released from the teeth 12ᵇ, immediately prior to the entrance of said roller to its seat in the recess 18ª. Said roller in entering either recess 18 or 18ª travels along the corresponding cam-shaped projection *a* and when fully seated in said recess is held against any tendency to accidental withdrawal therefrom under the weight of the implements by the cam-shaped projections *b* and the tensioning spring 25.

It will be obvious that when the implements are to be lowered, the operator again presses upon the foot-piece 22 whereupon the driven clutch member is locked to the driving member throughout the remaining one-half of a complete revolution, which in this instance is in a direction to accomplish such lowering, and is automatically released therefrom at the end of said movement, all as previously explained.

It has hereinbefore been stated that the clutch derives movement from any appropriate part of the tractor. It is deemed to be unnecessary herein to illustrate or describe any particular connection between the driving member 12 of said clutch and the part of the tractor from which said member is continuously rotated in the operation of the tractor; but I have illustrated a gear 33 as a part of such connection. Said gear is shown as being connected by a key 34 to the hub 35 of the clutch-driving member 12, through which hub the shaft 16 extends and within which said shaft is rotatably mounted. The end of the shaft which extends through the gear 13 and through the hub 35 is preferably reduced in diameter with respect to the remainder of the shaft and thereby forms a shoulder 36 against which one side of the gear 33 bears. A collar 37 bears against the other side of said gear and said shoulder and collar cooperate in holding the gear against lateral movement.

38 designate sockets which are integral with the tractor, or otherwise rigidly secured thereto. Each of these sockets has an open forward end whose walls 38' are inclined inwardly toward the center of the socket, the latter being closed at the rear end by a wall spaced inwardly from the walls 38' to provide a passageway 38'' rearward of said walls 38'. In the use of the tractor in propelling implements which are arranged in a non-trailing relationship with the tractor—that is, to implements which extend under the tractor or are arranged on opposite sides of the tractor—the sockets 38 provide means by which appropriate elements (as thrust bars Y, for example) of such implements may be connected to the tractor, said elements in practice extending through the mouths of the sockets and into said passageways and receiving the forward thrust which is imposed thereon in the forward travel of the tractor. In short, forward movement is given the implements in the forward travel of the tractor through the medium of the referred to sockets. Each socket is provided with a pin 39 which extends through its passageway 38'' and through an opening in the member of the implement arranged in said passageway and serves to hold said implement-member in its position within the socket. These pins also communicate rearward motion from the tractor to the implements, as in backing the tractor, and they are readily insertible or removable for an obvious reason. In order that they may not be lost when not in their operating positions, in the sockets, they are preferably provided with appropriate means, as chains 40, for example, by which they are attached to an appropriate part of the tractor body.

Reverting to the sockets, it will be noticed that their forward ends are substantially bell-shaped to facilitate easy entrance of the members of the implements which are to be seated in the passageways 38" when the implements are connected to the tractor; and it may be here mentioned that said passageways and implement-members are of such relative sizes that a clearance space will be provided between said members and the walls of the passageways, which contributes to the easy insertion of the members into the passageways and also permits relative sidewise movement between the tractor and the implements, provided, of course, the openings in said implement members through which the pins 39 extend are such as not to interfere with said relative sidewise movement.

The front end of the tractor is provided with a bracket which comprises a base member 42 and a pair of forwardly extending spaced arms 43 connected with the base member by a member 44, which rises from the base member and supports the arms in an elevated position. The arms 43 are arranged to receive between them an appropriate element (as a substantially vertically disposed hanger, indicated in dotted outline at 102) which extends from a tillage implement to be propelled by the tractor and is particularly intended for use when the implement referred to includes a frame, having a longitudinal opening to receive the tractor. The bracket and the element 102 referred to co-act in connecting the forward ends of the tractor and implement frame to each other. It will be noticed that the arms of the bracket are arranged to provide a forwardly open space between them and that their inner sides are so shaped that the forward end of said space will be flared, whereby they co-act with the bell-shaped mouths 38' of the sockets 38 in guiding the rear ends of the thrust members of the implement into said sockets. In my aforesaid application Ser. No. 622,757 the bracket which forms a part of the instant application for patent is shown in its co-operative relationship with an appropriate means by which the front end of the implement is connected to the tractor through the medium of a substantially vertically arranged hanger which supports a pivot about which the side sections of an implement frame have movement on a horizontal axis and a bridging member having screws which are adjustable to hold the side sections of the frame against relative movement about the said pivot or to permit such relative movement at will. In the instant application these parts are shown in dotted outline in order that a purpose for which the bracket is adapted may be better understood: the hanger being indicated at 102, the bridging member at 103, the screws at 103ª, the pivot at 104 and front members of the side sections of the implement frame at 105, in the instant application.

The tractor is also provided with a pair of arms 41 whose forward ends are suitably connected to the rear ends of the tractor as shown at 41'. These arms provide a yoke which may perform either of two functions: namely, (1) it may be employed as a supporting means for connections by which implements whose forward ends are suitably connected to the tractor may be held against side swaying or relative movements while permitted to have relative up and down movements in following the contour of the land, as in my aforesaid application numbered 505,416 and also in my aforesaid application numbered serially 622,760; and (2) it provides a draft yoke to which tillage implements, wagons or other means of vehicular nature may be connected to the tractor to be drawn by the latter.

Having now described the invention what I believe to be new and desire to secure by Letters Patent, is:

1. A farm tractor having a clutch comprising a driving member, a driven member and means for connecting said members to each other under control of the operator of the tractor and for disconnecting them from each other automatically upon the completion of a predetermined partial revolution of the driven member: said tractor also having a pluraltiy of lifting arms connected with each other for unitary movement and respectively adapted to be connected to implements which are to be raised and lowered under control of the clutch, said arms having their upper ends journalled to the frame of the tractor, a plurality of lugs or ears respectively fixed to said arms intermediate the ends of the latter; and a plurality of separate links respectively connecting said lugs or ears with the driven member of the clutch and operable by successive partial revolutions of the latter to swing the arms in clockwise and counterclockwise directions.

2. A farm tractor having a clutch comprising a driving member, a driven member and means for connecting said members to each other under control of the operator of the tractor and for disconnecting them from each other automatically upon the completion of a predetermined partial revolution of the driven member: said tractor also having a link, one of whose ends is pivoted to the driven clutch member and a swingable lifting arm having two lugs or ears both arranged intermediate its ends and to one of which the end of the link opposite the clutch is directly pivoted, to thereby act positively upon the arm at all times in the operation of the clutch, the other of said lugs or ears being adapted for the direct connection thereto of an element of a lifting means forming part of a tillage implement to be connected to and operated by, the tractor.

3. A farm tractor having a clutch comprising a driving member, a driven member and means for connecting said members to each other under control of the operator of the tractor and for disconnecting them from each other automatically upon the completion of a predetermined partial revolution of the driven member: said tractor also having a pair of links arranged at its opposite sides and whose corresponding ends are connected to said driven clutch member and a pair of unitarily movable lifting arms to which the other ends of the respective links are directly pivoted at places intermediate the lengths of the arms, to thereby act positively upon the arm at all times in the operation of the clutch, said arms also having means, intermediate their ends, for the direct connection thereto of elements of lifting means forming parts of tillage implements to be connected to and operated by, the tractor, and also having their ends opposite the links adapted for the direct connection thereto of lifting means of other tillage implements which are applicable to the tractor interchangeably with the first mentioned tillage implements.

4. A farm tractor having a pair of unitarily swingable arms, respectively arranged at its opposite sides and provided with means for connecting them to tillage implements, to raise and lower said implements from swinging movements of the arms, said tractor means for swinging said arms including a clutch comprising a driving member, a driven member, means for connecting said members to each other under control of the operator of the tractor and for disconnecting them from each other automatically upon the completion of a predetermined partial revolution of the driven member, a link forming a direct connection between the driven member of the clutch and one of said arms, and a second link having an indirect connection with said driven member, said indirect connection including a shaft which rotates with the driven clutch member and has an arm at its ends opposite said member, to which the corresponding end of the second link is pivoted.

5. A farm tractor having a clutch comprising a driving member, a driven member and means for connecting said members to each other under control of the operator of the tractor and for disconnecting them from each other automatically upon the completion of a predetermined partial revolution of the driven member: said tractor also having a pair of unitarily movable lifting arms respectively adapted to be connected to implements which are to be raised and lowered under control of the clutch, said arms having their upper ends journalled to the frame of the tractor; and means operable by successive partial revolutions of the driven member of the clutch to swing said arms in clockwise and counterclockwise directions, said means including a link which forms a direct connection between one of the lifting arms and the driven clutch member, a shaft operatively connected to said clutch member and provided with a crank and a link connecting said crank with the other lifting arm.

6. A farm tractor having a clutch comprising a continuously rotating driving and an intermittently rotating driven member, a lifting bail journalled to the underside of the body of the tractor and whose arms are adapted to be connected to tillage implements, respectively, a link forming a direct connection between one of said arms and the driven member of the clutch and a separate connection between the other of said arms and said driven clutch-member, the latter connection including a shaft which extends transversely of the tractor, a crank mounted on one end of said shaft and a link which forms a direct connection between the corresponding bail arm and crank; said clutch having means for connecting its driven member to the driving member under control of the operator of the tractor and for disconnecting said driven member from the driving member automatically when the driven member has made a predetermined partial revolution with the driving member, and the connections between the arms of the lifting bail and the driven member of the clutch being operative to swing said arms in clockwise and counterclockwise directions from successive partial revolutions of the driven clutch-member.

7. A farm tractor having at its forward end a bracket which is fixedly secured thereto and is provided with arms relatively arranged to provide a forwardly open substantially horizontal passageway adapted to receive a member which rises from the forward end of a tillage implement and to co-act with said member in connecting the tractor to said implement.

8. A farm tractor having at its forward end a fixed bracket comprising a base, a member which rises from said base and a member which extends forwardly from the upper end of the latter member and is bifurcated to provide a forwardly open passageway adapted to receive a member of a connecting means which rises from the forward end of a tillage implement.

9. A farm tractor having members which respectively project outwardly from opposite ends of its rear end portion and are adapted to impart movement to a tillage implement having tillage elements arranged on opposite sides of the tractor and whose frame extends across the forward end of the tractor, said tractor also having at its said front end a bracket provided with forwardly extending arms relatively positioned to receive between them a member which rises from the middle part of the forward end of the portion of the implement frame which extends across the front end of the tractor.

10. A farm tractor having at its forward end a fixed bracket comprising a base, a member which rises from said base and arms which project forwardly from the upper end of said member and are relatively arranged to form a forwardly open passageway having a flaring mouth to receive an element of a tillage implement by which the bracket is connected to said implement when the tractor and implement are in operative relationship with each other.

11. A farm tractor having means for connecting a tillage implement thereto, including means at the opposite sides of the tractor to engage thrust members of the implement and a fixed bracket at the forward end of the tractor, said bracket having its upper end provided with forwardly extending arms relatively arranged to form a forwardly open recess to receive an element projecting from the forward end of said implement.

12. A farm tractor according to claim 11, in which the means to engage thrust members of the implement are sockets formed with substantially bell-shaped mouths and having passageways rearward of their said mouths and in which the recess between the arms of the bracket has a flaring mouth.

13. A farm tractor having a clutch comprising a continuously rotating driving member and an intermittently rotating driven member, mounted on a common axis, a pair of unitarily movable arms respectively arranged on opposite sides of the tractor and whose upper ends are journalled to the body of the tractor, said arms being adapted to be connected to tillage implements, and means, including a link which forms a direct connection between one of said arms and the driven member of the clutch, and a second link which forms an element of an indirect connection between the other of said arms and the driven member of the clutch, for swinging the arms in clockwise and counterclockwise directions respectively by intermittent partial revolutions of said driven member.

14. A farm tractor provided with means arranged at its opposite sides and forward of its rear end for independent pivotal connection to the tractor of a plurality of separate tillage implements, said tractor also having a second means arranged to support appropriate connections by which said implements are confined against undue sidewise swaying or relative lateral movement while permitted to have relative up and down movements in following the contour of the land, said second means comprising a pair of arms whose forward ends are attached to the tractor body and extend thence rearwardly in a convergent direction and thence rearwardly parallel with each other for engagement with the aforesaid connections or optionally to form a draft yoke to be engaged by an implement or vehicular structure behind the tractor.

CHARLES T. RAY.